(No Model.)

W. R. CRAIG.
FLUE HOLE CUTTER.

No. 448,126.  Patented Mar. 10, 1891.

Attest:
H. H. Schott
Jno. L. Boyden.

Inventor
William R. Craig
per John G. Pasker, Atty

UNITED STATES PATENT OFFICE.

WILLIAM R. CRAIG, OF SHELBY, ALABAMA, ASSIGNOR OF ONE-HALF TO HOMER R. STOUGHTON, OF SAME PLACE.

FLUE-HOLE CUTTER.

SPECIFICATION forming part of Letters Patent No. 448,126, dated March 10, 1891.

Application filed September 6, 1890. Serial No. 364,147. (No model.)

*To all whom it may concern:*

Be it known that I, WILLIAM R. CRAIG, a citizen of the United States, residing at Shelby, in the county of Shelby and State of Alabama, have invented certain new and useful Improvements in Flue-Hole Cutters; and I do hereby declare the following to be a full, clear, and exact description of the invention, such as will enable others skilled in the art to which it appertains to make and use the same.

This invention relates to an improvement in devices for cutting flue-holes, the particular object thereof being to provide a suitable cylindrical cutter-head for use in cutting out the flue-holes in the heads of boilers, although it can be used for cutting holes in sheet or plate metal wherever they may be needed and where it is particularly desirable that they be made perfectly true and of uniformly equal size; and the invention therefore consists in the construction, arrangement, and combination of parts, substantially as will be hereinafter described and claimed.

Figure 1:
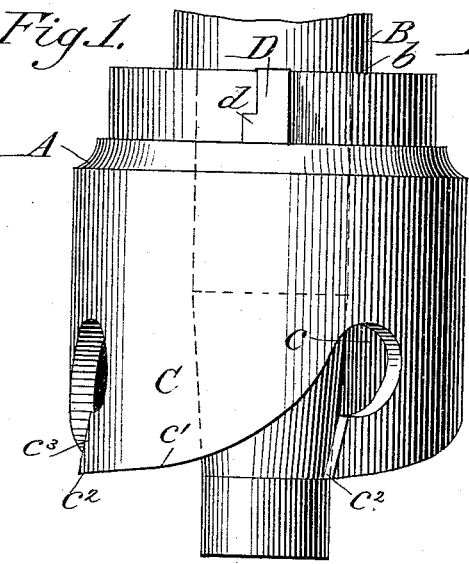
Figure 2:
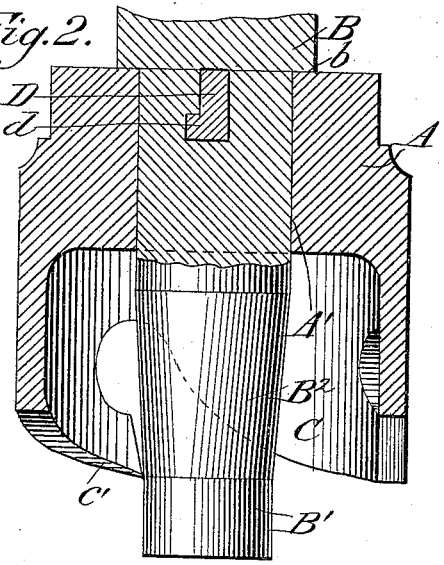
Figure 3:
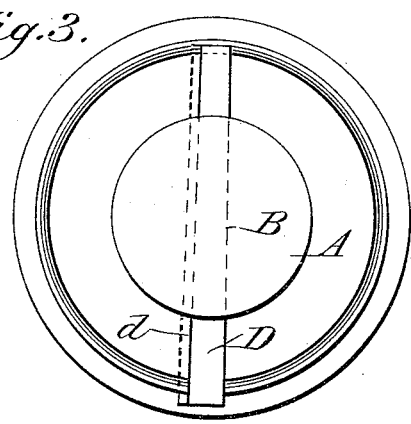
Figure 4:
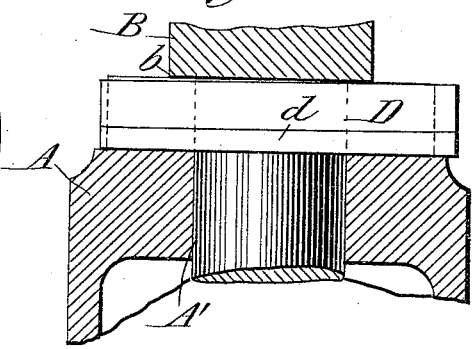
Figure 5:
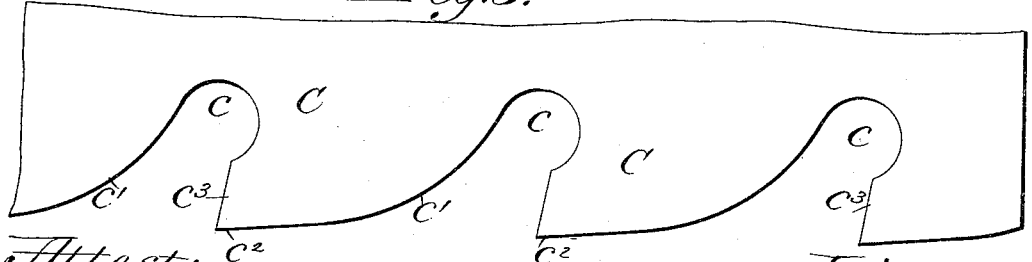

In the accompanying drawings illustrating my invention, Figure 1 is a side elevation of my improved flue-hole cutter. Fig. 2 is a vertical section of the same, the mandrel being shown in partial elevation. Fig. 3 is a top end elevation of the device, as shown in Figs. 1 and 2. Fig. 4 is a partial section showing the wedge and the slot within which it operates, whereby the cutter-head and mandrel are firmly combined together. Fig. 5 is a diagrammatic or outline view showing the form of the cutting-teeth.

Similar letters of reference designate corresponding parts throughout all the different figures of the drawings.

A denotes the cutter-head. It is made of hollow cylindrical form of suitable size to adapt it for the purposes for which it is intended. This cutter-head A is provided with a circular bore A' of suitable diameter to contain the mandrel, said bore A' being of considerably less diameter, preferably, than the main hollow portion of the cutter-head.

The cutter-head A is provided with teeth C. There may be any number of these teeth. Their number will vary according to their size. These teeth are of suitable shape to enable them to successfully cut the material where the hole is to be made, this cut resulting from the revolution of the cutter-head by means of the mandrel to which it is connected, said mandrel being actuated in any desirable manner and by any suitable means. The form of the teeth with which the cutter-head is provided is shown in the diagrammatic or outline view of Fig. 5. Here it will be seen that the edge of the cutter-head has the metal cut out to form the rounded opening $c$, from which the curved edge $c'$ runs to the tooth-point $c^2$. The tooth-point $c^2$ connects with the opening $c$ by means of the straight edge $c^3$. Thus is provided a tooth C, having points $c$, a straight edge $c^3$, and curved edge $c'$. This construction of the teeth gives them the greatest strength attainable from the metal used in the making of the cutter-head, and at the same time provides plenty of space or clearance for the shavings or cuttings. It is thought that this is the best form of tooth to employ, and therefore I make the teeth in this way, although I reserve the liberty of varying the exact form thereof, if experience should dictate some trifling change.

B denotes the mandrel which supports the cutter-head and extends through the same. This mandrel is provided with a shoulder $b$, against which the end of the cutter-head A neatly fits after the mandrel has been inserted through the opening A'. The other end B' of the mandrel is preferably of somewhat less diameter than the part which lies within the cylindrical bore A', and this end B' forms a central guide for the cutter. The center hole is drilled at very much higher speed than it is practical to run the cutter, and the end of the mandrel forms a very useful guide when the cutter is in motion. The section of the mandrel between the end B' and the end within the bore A' is preferably tapered or beveled slightly, as at $B^2$, and, if desired, the end B', as shown in Figs. 1 and 2, may be formed cylindrical. This mandrel is an interchangeable one, and is removable from the cutter-head at pleasure. The mandrel, as well as the cutter-head, is provided with a transverse slot, which receives a wedge D, which is provided with a flange $d$, the slot being of suitable shape to neatly receive the said wedge—that is to say, the slot will be of the same form as the wedge, so that the flange $d$ may have a space for its reception. When the mandrel has been inserted into the cutter-head with its shoulder $b$ resting closely against the end of the cutter-head and its slot in coincidence with the slot cut in the end of the cutter-head, as shown in Figs. 3 and 4, then the wedge D may be inserted into the slot, thereby firmly connecting the cutter-head and mandrel together, so that the device may be practically used.

This cylindrical cutter-head for cutting flue-holes, provided with the described teeth, enables excellent results to be accomplished in the cutting of holes in sheet metal. It furnishes a novel and useful tool, having great strength and durability. Its simplicity commends it as an improved device, and the result of using it has been found of great utility.

Having thus described my invention, what I claim as new, and desire to secure by Letters Patent, is—

1. The herein-described flue-hole cutter, consisting in the combination of the mandrel, the circular cutter-head provided with teeth, and the wedge for connecting the mandrel firmly to the cutter-head, so that the device may be employed for cutting holes in metal, substantially as described.

2. In a flue-hole cutter, the combination of the cylindrical cutter-head A, having the teeth C, and the mandrel B, passing through said cutter-head, the point of the mandrel extending through the head and forming a center guide for the cutting-teeth, and the wedge passing through a slot in the mandrel and the head and connecting them together, substantially as described.

3. In a flue-hole cutter, the cylindrical cutter-head A, provided with a series of three or more teeth C, said teeth having a point $c^2$, a straight edge $c^3$, and a curved edge $c'$, which latter edge runs from the point $c^2$ to the opening $c$, substantially as described.

4. In a flue-hole cutter, the combination of the cutter-head A, having the cylindrical bore A' and the teeth C, having points $c^2$, straight edge $c^3$, and curved edge $c'$, and the mandrel B, having shoulder $b$ and end B', and the wedge D, passing through a slot in the mandrel and the cutter-head and provided with a flange $d$, substantially as described.

In testimony whereof I affix my signature in presence of two witnesses.

WILLIAM R. CRAIG.

Witnesses:
E. E. TIMOTHY,
ED. T. WITHERBY.